United States Patent [19]

Hondulas

[11] Patent Number: 4,880,533
[45] Date of Patent: Nov. 14, 1989

[54] APPARATUS AND SYSTEM FOR TREATING WASTE WATER AND SLUDGE

[76] Inventor: John Hondulas, Rte. 4, Box 505, Gatlinburg, Tenn. 37738

[21] Appl. No.: 204,533

[22] Filed: Jun. 9, 1988

[51] Int. Cl.[4] .................... B01D 17/035; C02F 1/40
[52] U.S. Cl. .................... 210/104; 210/179; 210/181; 210/221.2; 210/739; 210/744; 210/776; 159/22; 159/33; 159/42; 159/47.3
[58] Field of Search ............ 210/523, 525, 526, 527, 210/531, 533, 537, 536, 538, 540, 221.2, 179, 181, 147, 740, 739, 744, 104, 241, 242.3, 776; 159/42, 42 R, 22, 33, 47.31

[56] References Cited

U.S. PATENT DOCUMENTS

| | | | |
|---|---|---|---|
| 2,826,306 | 10/1953 | Burns | 210/533 |
| 3,396,846 | 8/1968 | Hamilton | 210/740 |
| 3,642,583 | 2/1972 | Greenberg et al. | 159/42 R |
| 3,807,560 | 4/1974 | Pentz et al. | 210/740 |
| 3,872,005 | 3/1975 | Baker | 210/527 |
| 3,890,289 | 6/1975 | Johnson | 210/523 |
| 4,226,714 | 10/1980 | Furness et al. | 210/740 |
| 4,235,726 | 11/1980 | Shimko | 210/523 |
| 4,273,658 | 6/1981 | Karman | 210/740 |
| 4,336,143 | 6/1982 | Abbott | 210/740 |
| 4,514,303 | 4/1985 | Moore | 210/525 |
| 4,534,828 | 8/1985 | Erickson et al. | 159/42 |
| 4,610,785 | 9/1986 | Russell | 210/527 |
| 4,614,589 | 9/1986 | Weis | 210/194 |

Primary Examiner—Richard V. Fisher
Assistant Examiner—Cynthia L. Nessler
Attorney, Agent, or Firm—Lalos & Keegan

[57] ABSTRACT

The present invention includes an apparatus and system for treating waste water. More specifically, for the removal of a floating component of the waste water from the remaining water relatively free of the floating component. The apparatus includes a separating chamber having a movable flow gate disposed at one side thereof. A preferred embodiment of the present apparatus includes a skimmer that is movable in both horizontal and vertical directions for facilitating the removal of the floating component of the waste water from the separating chamber. The present system includes an apparatus for treating waste water and sludge.

44 Claims, 3 Drawing Sheets

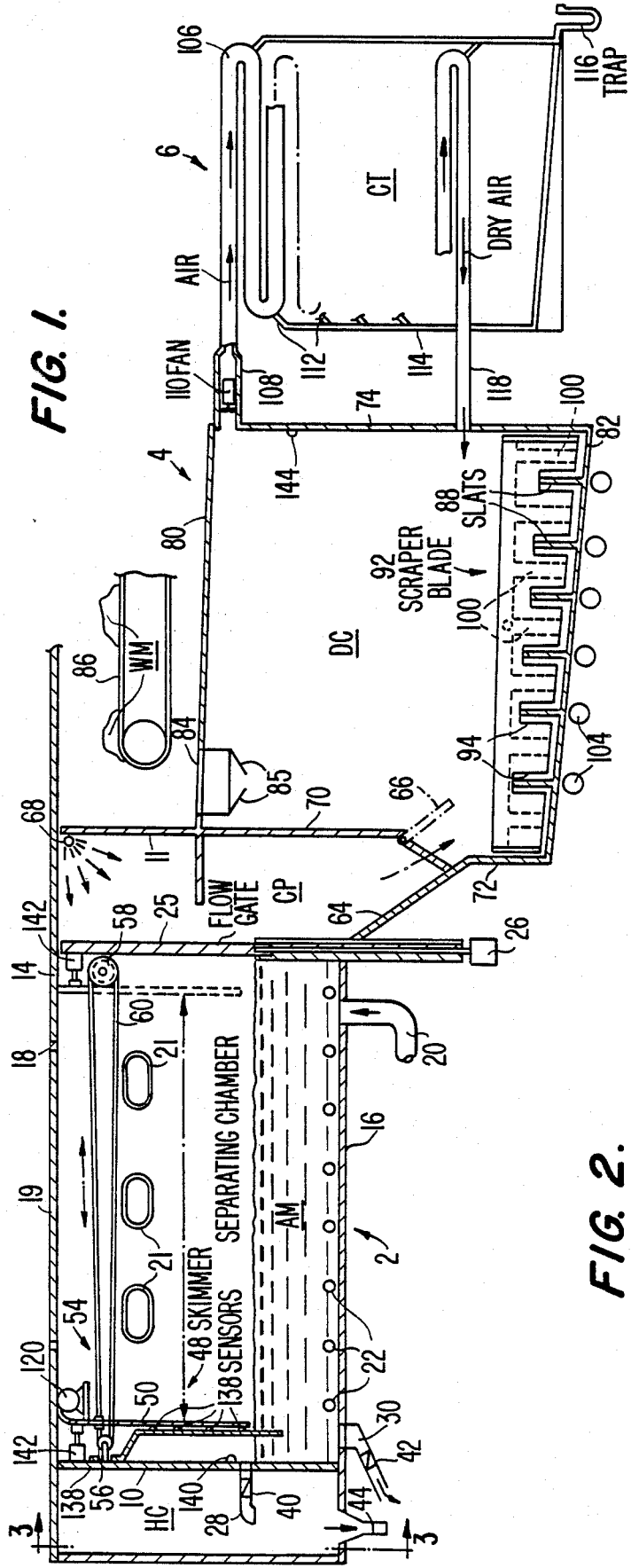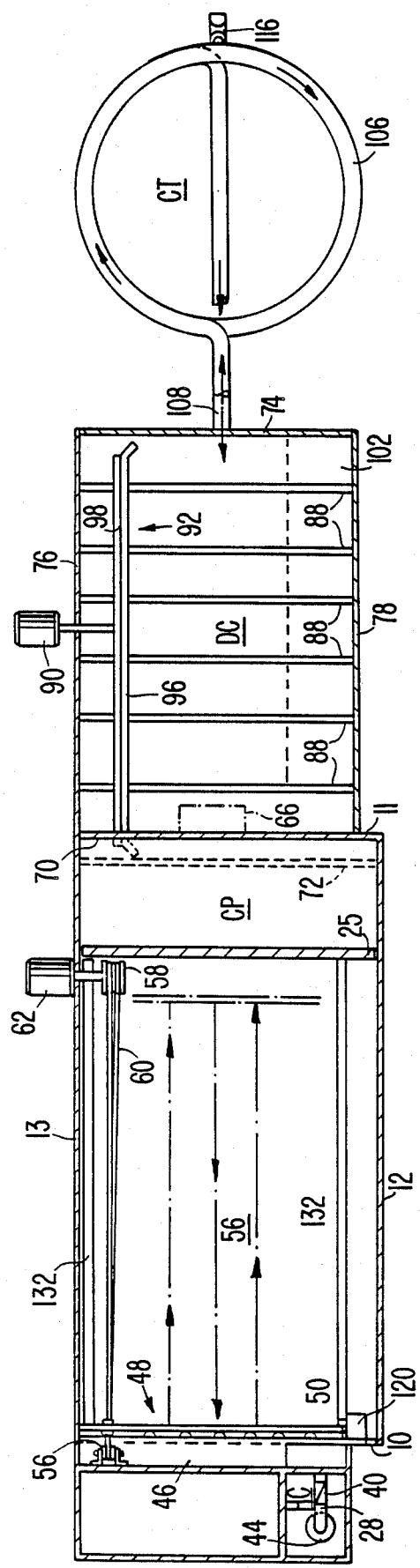

APPARATUS AND SYSTEM FOR TREATING WASTE WATER AND SLUDGE

BACKGROUND OF THE INVENTION

This invention relates to an apparatus and system for treating waste water and sludge. More particularly, this invention relates to an apparatus and system for separating and drying floating components such as grease, fat, oil and/or solid components of an aqueous mixture, and for removing water from and drying sludge.

In many communities the local municipality provides a service of picking up waste water collected as an aqueous mixture of grease, fat, oil and/or solids pumped from grease traps of kitchen clean up areas of local restaurants. These grease traps are typically in the range of 500 to 1,000 gallons in size for providing a reasonable duration of time between emptying operations. This service prevents the dumping of this type of waste water directly into the public sewage system where the grease, fat, oil and/or solid components would likely create clogging of underground piping. A municipal vehicle such as a tank truck is sent around on a regular periodic or demand basis to drain these grease traps and return to the local waste water treatment facility to process the collected waste water.

The present apparatus would typically be located at a local waste water facility and would be incorporated into the conventional waste water treatment system at the facility. In addition, other components are added to the conventional waste water treatment system resulting in a new waste water treatment system in which the present apparatus is one of the components of the system. The present apparatus has been constructed to specifically handle and process waste water constituting an aqueous mixture containing grease, fat, oil and/or solid components collected from around the local community at places of generation of this type of waste water such as restaurants as discussed above. Further, the present apparatus and system have been devised to handle and process "scum" which is defined as a dirty aqueous mixture containing grease, fat, oil and/or solids generated at the upper surface portions of a primary tank or basin (settling pond), which is a typical component of a conventional waste water facility. The scum is typically removed from the upper surface portions of the primary basin by a surface skimmer, which collects and then transports the scum to another location of the facility for further treatment. In the present system, the scum would eventually be transported to the present apparatus for further treatment.

The system of the present invention is also devised to handle and process sludge collected at the bottom of the primary basin of the conventional waste water treatment facility. I the past, periodically the primary basins are drained of their liquid components for facilitating the removal of settled solids collected on their bottoms. These solids are then loaded into a digester where they are acted on by anaerobic bacteria resulting in the degradation of organic matter and the production of gases. A supernate and residual humus or stabilized digested sludge ar produced within the digester as a result of the bacteria action. The gas produced in the digester is predominantly methane, which at a few waste water treatment plants is used to operate generators and boilers. However, in the majority of plants the gas produced is not utilized, but instead is vented into he atmosphere and burned. The substantially clear water or supernate is drained and further treated at another location of the waste water treatment facility. The solids that have collected at the bottom of the digester in the form a sediment paste or digested humus are typically pumped to either a press or centrifuge to further remove water therefrom. The resulting waste mass from the press or centrifuge is typically loaded onto dump trucks for removal to dumps and landfill sites.

Due to greater public interest and concern with respect to difficulties and problems presented by dumps and landfills, such as seepage of waste into local water tables, policies and regulations have arisen that prevent or make difficult the dumping of this type of waste. Further, the waste removed from a press or centrifuge still contains a significant amount of water, with a moisture content of approximately seventy to eighty percent by weight, making it difficult to transport, handle and to compact at landfills because of its tendency to flow and to hydraulically pump under the weight of compaction equipment. Also, this type of waste has been known to dissolve back into solution by ground water when buried at dumps and landfills creating a significant seepage problem at the site.

The apparatus of the present invention is utilized to further process the separated scum from the separating chamber of the apparatus and the waste mass from a press or centrifuge by a drying process, resulting in dried waste mass. The dried waste mass substantially reduces the cost of transportation to dumps and landfills due to its greatly reduced weight, volume and its ability to be compacted. Further, the dried waste mass is more manageable for purposes of handling since it does not flow.

The dried waste mass is substantially more resistant to dissolving by ground water and can be readily compacted into a layer at a dump or landfill. When the waste mass or dried humus has been subjected to a drying process at a temperature in excess of 160° F., with the attendant reduction of moisture content to under twenty-five (25) percent, all dangerous pathogens within the dried waste mass are destroyed. The dried waste mass is now sanitized to the point where it can be safely handled and applied to row crops as fertilizer or can be used for other agricultural purposes. The nitrogen content varies from 0.8 to 0.9 percent and the potassium and calcium contents are high. The EPA standards are met by the foregoing treatment. It is expected that the temperature within the drying oven will be in excess of 200° F. and that the moisture content of the dried waste mass will be quite small. This will destroy all pathogenic bacteria and viruses, as well The addition of hydrated lime provides additional insurance that all pathogens will be destroyed due to the rise of the pH level to approximately 12. Further, the end product will be more friable and easy to apply to row crops. Thus, the present apparatus and system converts a substance that has previously been considered a problematical waste product into a useful product.

As described above, during operation of a conventional waste water treatment facility, methane gas is produced as a by-product of some of the treatment processes such as that occurring within a digester. The present apparatus and system utilize this methane gas as an energy source for fueling the drying chamber of the present apparatus. Thus, the cost involved in operating the present apparatus is minimal due to the essentially free energy source available at the waste water treatment facility.

SUMMARY OF THE INVENTION

The principal object of the present invention is to provide an apparatus and system for treating waste water and sludge.

Another object of the present invention is to provide an apparatus and system for treating an aqueous mixture containing grease, fat, oil and/or solid components, and for treating sludge.

A further object of the present invention is to provide an apparatus and system for separating and drying the grease, fat, oil and/or solid components from the water phase of the aqueous mixture, and to remove water from and dry sludge.

A still further object of the present invention is to provide an apparatus and system for treating an aqueous mixture containing grease, fat, oil and/or solid components by separating the grease, fat, and/or oil as a scum from the water phase followed by drying of the scum.

Another object of the present invention is to provide an apparatus and system for separating grease, fat, oil and/or solid components from the water phase of an aqueous mixture containing the same, which involves a relatively simple design of components, requires a comparatively small amount of energy input and is highly effective in performance.

A further object of the present invention is to provide an apparatus and system for utilizing gas by-products of a waste water treatment facility as a fuel source for drying purposes.

Other objects and advantages of the present invention will become more evident to those persons having ordinary skill in the art to which the present invention pertains from the following description taken in conjunction with the accompanying drawings.

BRIEF DESCRIPTION OF THE DRAWINGS

The present invention will become more fully understood from the accompanying drawings wherein:

FIG. 1 is a vertical cross-sectional view of an apparatus embodying the present invention;

FIG. 2 is a horizontal cross-sectional view of the embodiment shown in FIG. 1, taken along line 2—2;

DETAILED DESCRIPTION OF THE PREFERRED EMBODIMENTS

Figure 3:
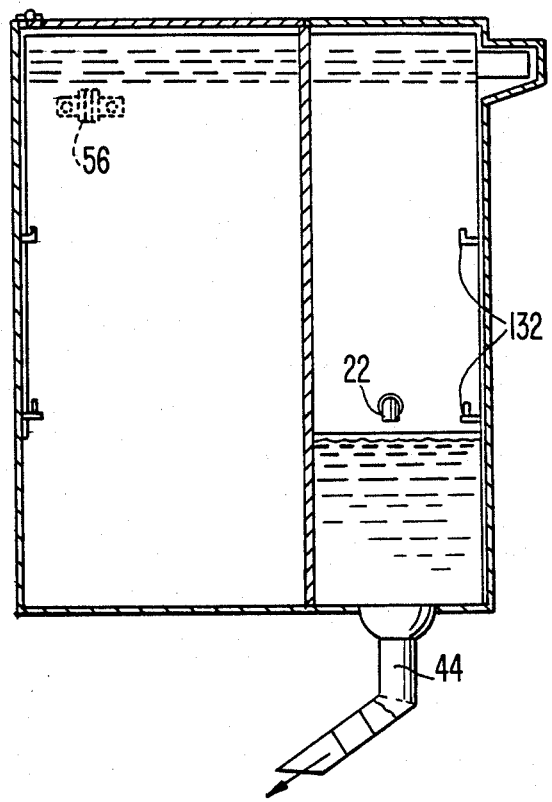
FIG. 3 is a cross-sectional view of the embodiment shown in FIG. 2, taken along line 3—3.

Referring to the drawings, there is shown a preferred embodiment of the present invention. The preferred embodiment comprises a combination of basic components including a separating tank 2, a drying unit 4, a condenser unit 6 and a control system CS.

Figure 6:
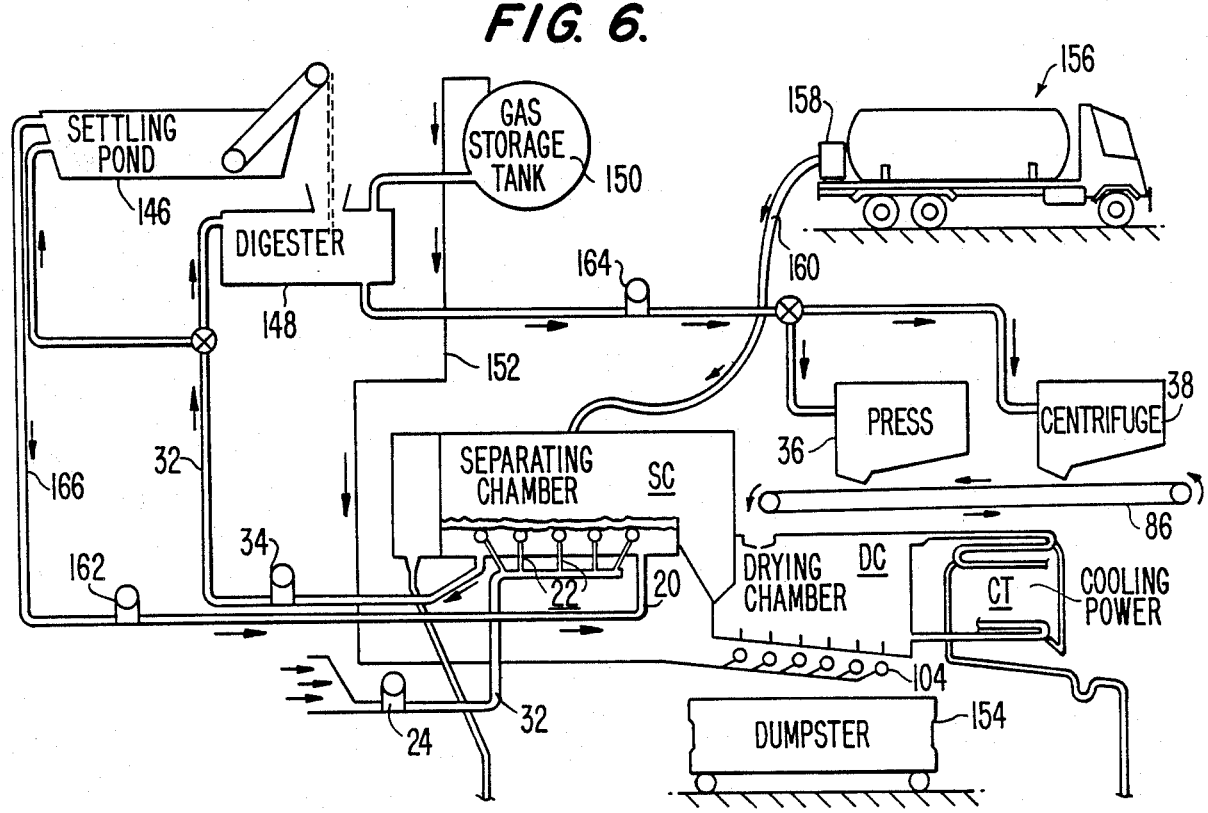
FIG. 6 is a schematic diagram of the apparatus and system embodying the present invention.

The separating tank 2, for receiving a quantity of waste water comprising an aqueous mixture AM containing grease, fat, oil and/or solid components to be processed, includes a pair of end walls 10 and 11, a pair of side walls 12 and 13 and top and bottom walls 14 and 16 defining a separating chamber SC shown in FIGS. 1, 2 and 6.

Waste water can be added to separating chamber SC through an opening 18 in the separating tank 2, such as through top wall 14 as shown in FIG. 1. An access door 19 is provided for sealing the opening 18 during operation. In addition, an inlet conduit 20 is provided through one of the walls of the separating chamber SC such as bottom wall 16 for the addition of waste water such as scum from a primary basin.

The separating chamber SC can be provided with viewing ports 20 to allow an operator to view the inside of the separating chamber SC to determine the extent of separation of the aqueous mixture AM. The viewing ports are preferably made of glass coated with a layer of material such as Teflon to prevent grease, fat and/or oil from coating the glass and blocking visibility into the separating chamber SC.

The separating chamber SC is provided with a gas injection system and includes gas inlets 22 for introducing bubbles of gas into separating chamber SC at least partially filled with the aqueous mixture AM. For example, air can be injected into the aqueous mixture AM by supplying air through air lines 23 leading to gas inlets 22 as shown in FIG. 6. The air is introduced into the air lines 23 by means of a compressor 24.

A flow gate 25 is provided within the separating tank 2. The flow gate 25 is actuated upwardly and downwardly by means of actuating means 26, such as a screw jack positioned and connected below the flow gate 25. Other actuating means such as a pneumatic or hydraulic piston/cylinder, rack and pinion drive, driven cable attached for example to a motor driven drum having a pulley on which the cable wraps and unwraps, and other conventional linear actuating means can be utilized in place of the screw jack.

The separating tank 2 is provided with a first outlet 28 for lowering the level of aqueous mixture AM within the separating chamber SC to allow the separation add removal of various layers or portions of layers of the aqueous mixture AM once settling has occurred. The first outlet 28 is positioned at a predetermined height within the separating chamber SC. A second outlet 30 is provided through bottom wall 16 for draining paste-like sediment that has collected at the bottom of the separating chamber SC. Both the first outlet 28 and the second outlet 30 are provided with flow valves 40 and 42, respectively, such as manually operated valves or more preferably remote controlled flow valves which can be automatically operated from a remote location, for controlling the flow therethrough.

A holding chamber HC is located at one end of the separating tank 2. The holding chamber HC is provided with a drain 44. A baffle plate 46 is provided within the separating chamber SC covering and separating the first outlet 28 from an upper portion of the separating chamber SC. The positioning of the baffle plate 46 within separating chamber SC prevents grease, fat and/or oil components, which are the lighter components of aqueous mixture AM having lower specific gravities from exiting the separating chamber SC through first outlet 28. Baffle plate 46 is an important feature, especially during filling of the separating chamber SC when there exists substantial fluid movement and mixing of the aqueous mixture AM.

Figure 4:
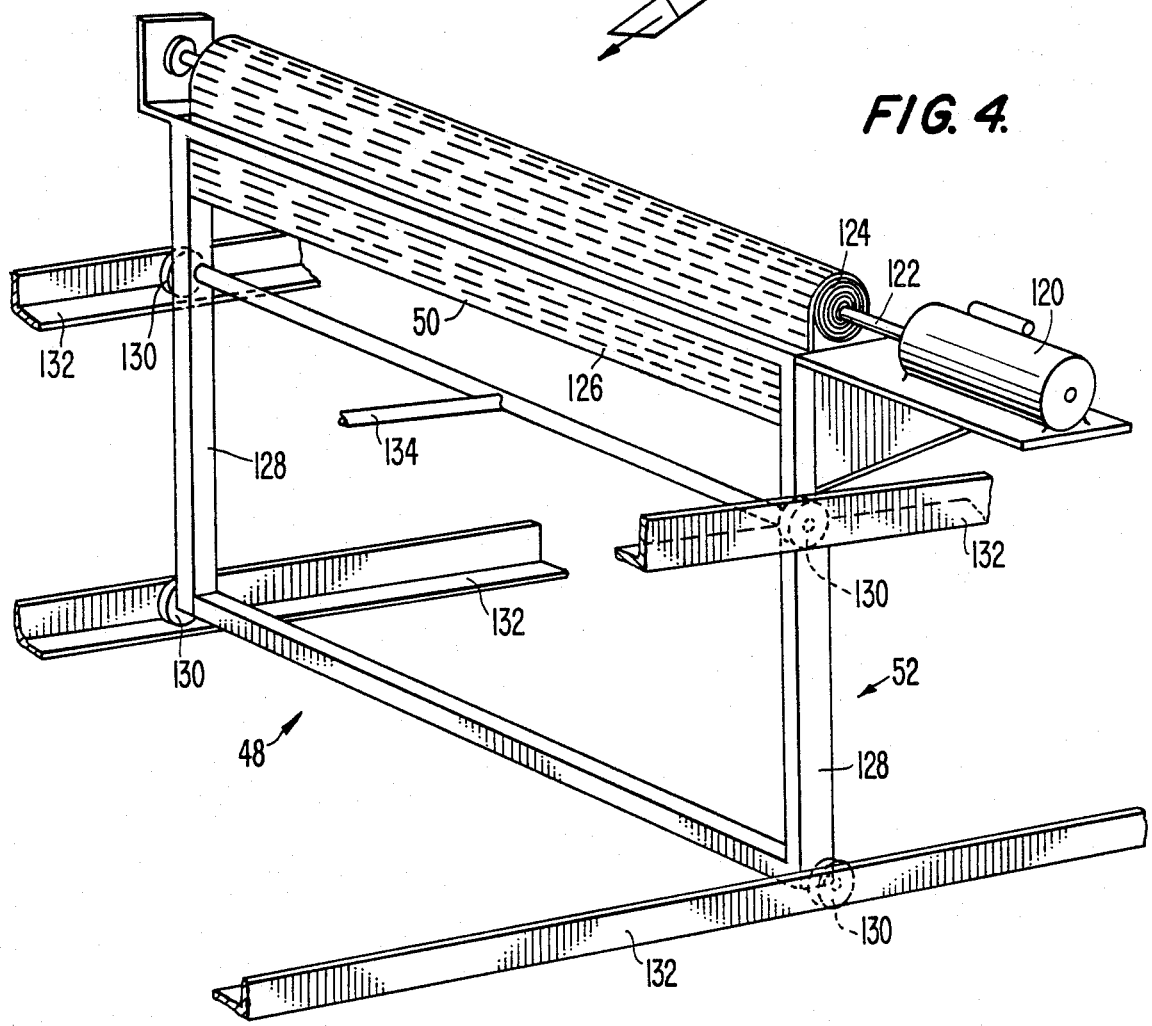
FIG. 4 is a perspective view of a skimmer employed in the embodiment shown in FIGS. 1-3.

The apparatus of the present invention can be provided with a moveable skimmer 48 having a skimmer blade 50. The skimmer blade 50 is supported on a carriage 52 as shown in FIG. 4 (carriage 52 has not been shown in FIG. 1 to simplify this figure). Details of the carriage 52 will be discussed below. The carriage 52 is actuated by an drive means 54, such as pulleys 56 and 58 supporting an endless cable 60 with a motor 62 driving pulley 56 for moving the carriage 52 and skimmer blade 50 across the separating chamber SC in the rightward direction during a skimming operation. Alternatively, the skimmer blade 52 can be actuated by drive means such is a screw jack, fluid piston/cylinder, rack and pinion drive, or other linear actuating means.

The separating chamber SC is provided with a chute portion CP having an inclined surface 64 extending into a collector, such as drying unit 4. The chute portion CP is provided with an outlet valve, such as outlet door 66 for allowing scum to flow down along the inclined surface 64 into the drying unit 4 and to prevent humidity or other gases from escaping back into the separating chamber SC. The outlet door 66 is preferably spring loaded so as to generally remain closed during operation and only opening due to the weight of scum flowing down inclined surface 64 urging the outlet door 66 open. Also, the chute portion CP is provided with a spray head 68 for spraying water into chute portion CP to facilitate the flowing of scum down incline surface 64 and to maintained chute portion CP in a relatively clean operating condition.

The chute portion CP of the separating tank 2 is preferably an integral portion of the separating tank 2 fabricated from extensions of the same walls defining the separating chamber SC. This construction ensures an air tight assembly preventing the leakage of polluting and noxious gases into the surrounding environment of the apparatus. However, the chute portion CP could conceivably be a separate structural unit connected to the separating tank at an exit port thereof.

The drying unit includes an upper and lower end wall 70 and 72 positioned, respectively, above and below the exit of chute portion CP, another end wall 74, a pair of side walls 76 and 78, top wall 80 and bottom wall 82 defining a drying chamber DC.

The bottom wall 82 of the drying unit is slanted downwardly in a direction away from chute portion CP and provided with a plurality of vertical slats 88. The bottom wall 82 is slanted to facilitate distribution of scum over the entire bottom of the drying chamber DC to provide a greater contact area of the scum with dried air circulated through the drying chamber DC. The greater contact area results in more efficient water evaporation from the scum during the drying operation The drying unit 4 is provided with a scraper blade 92 connected to a drive means 90, such as a screw jack. The scraper blade 92 is provided with a plurality of slots 94 for accommodating vertical slats 88. The scraper blade 92 is preferably constructed of a scraper plate 96 attached to a reinforcing backing plate 98 having finger-like extensions 100 to reinforce the portions of the scrape plate 96 which extend into the spaces between adjacent vertical slats 88.

The scraper blade 92 pushes dried waste mass across the bottom wall 82 so that it exits from an outlet, such as hinged outlet door 102 for dumping purposes The drying chamber DC is heated by means of a plurality of burners 104 located beneath bottom wall 82. The burners 104 are fueled by waste methane gas formed at other locations in the waste water treatment facility, such as a digester, or can be fueled by natural gas if methane is not readily available. Each burner is located beneath each vertical slat 88 to provide good heat transfer to the slats 88 which provide a large surface contact area with the scum and/or waste mass to provide more efficient heat transfer for drying purposes.

Operatively connected to the drying unit 4 is condensing unit 6. The condensing unit 6 includes a cooling tower CT having a condensing coil 106. The condensing coil 106 is connected to the drying unit 4 by means of an outlet conduit 108 extending from a position near the top of the drying chamber DC. A motorized fan 110 is provided in the outlet conduit 108 providing the forced circulation of air from the drying chamber DC into the condensing coil 106.

At the end of each turn of the condensing coil 106 is provided a connection drain conduit 112 each leading into a main drain conduit 114. The main drain conduit 114 leads into a trap 116 for preventing the reverse flow of air. Each turn of the condensing coil 106 is oriented off level so that condensation in that particular turn is drained into one of the connector drain conduits 112. A lower end 118 of the condensing coil 106 is connected into a lower portion of the drying unit 4 for returning relatively dry air to the drying chamber DC. An important and vital objective is served by incorporating a wholly closed system for separation, drying and condensing in that the process can go forward without serious or objectionable odors escaping therefrom. This is an important factor of any waste water facility due to their proximity to other commercial and industrial areas.

In FIG. 4, the details of skimmer 48 are shown comprising a carriage 52 having a drive means, such as a remote controlled motor 120, driving a shaft 122 which supports a roll 124 of a continuous sheet of material 126. The continuous sheet of material 126 in one embodiment comprises a plurality of strips of metal hinged together. The carriage 52 includes support member 128, which have U-shaped cross sections providing guiding channels for the continuous sheet of material 126.

The carriage 52 is provided with a set of guide wheels 130, which are supported and guided by means of guide rails 132 provided on the inner walls of separating tank 2. The carriage 52 is provided with a connecting member 134 for attaching a drive means such as a screw jack, fluid piston/cylinder, rack and pinion drive, or other known conventional linear drive means.

CONTROL SYSTEM

The present apparatus can be operated by a manual control system in which an operator opens and closes valves and switches based on the visual observation of the contents of the separating chamber through viewing ports 21. However, a substantially fully automatic control system is preferable for hands off and continuous operation of the present apparatus.

Figure 5:
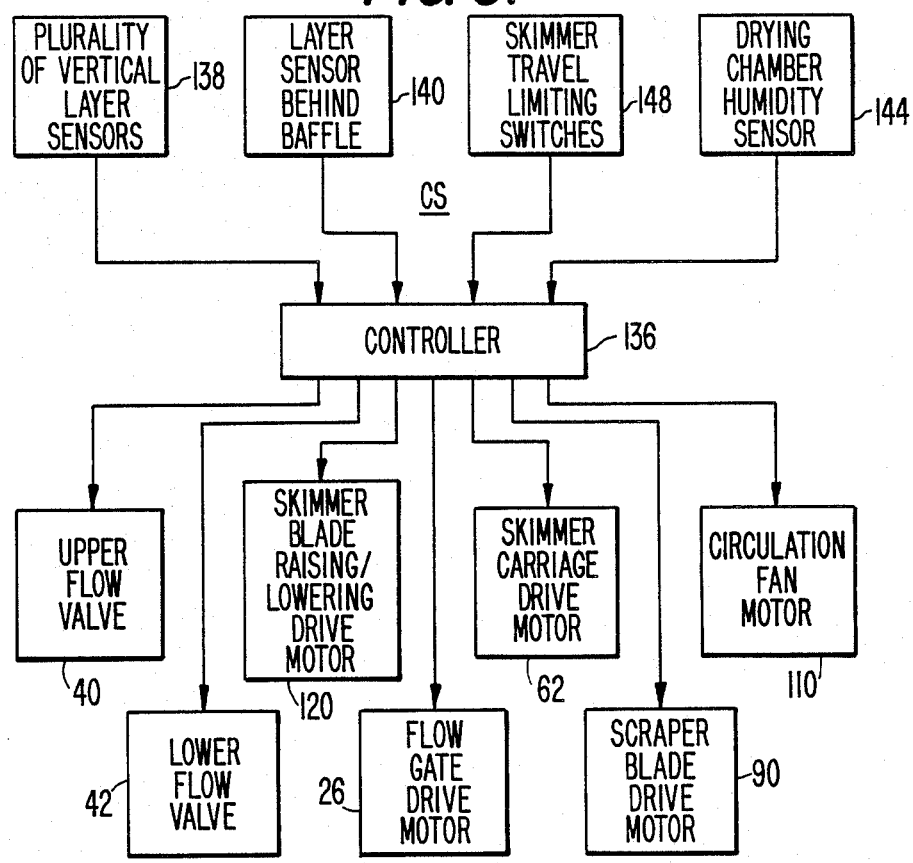
FIG. 5 is a block diagram of the control system utilized in the embodiment shown in FIGS. 1-4.

One embodiment of the automatic control system CS is shown in FIG. 5. This control system CS includes a controller 136 either comprising of a plurality of individual control units interconnected or a microprocessor controller adapted or designed for the below described operations The type of controller utilized and the manner in which it operates and is interfaced into the automatic control system as well known in the art of automatic controls. However, the specific adaptation of a controller for the operation of the apparatus is considered to be part of the subject matter of the present invention.

The controller 136 is operably connected to input devices including a plurality of vertical fluid layer sensors 138 positioned at fixed intervals of distance within the separating tank 2 in the vertical direction; a fluid layer sensor 140 located at a level of approximately 3 to 4 inches higher than the inlet of the first outlet 28; skimmer travel limiting switches 142; and a drying chamber humidity sensor 144. The controller 136 is operably connected to output devices including upper flow valve 40; lower flow valve 42; skimmer blade (raising/lowering) drive motor 120; flow gate (drive motor) actuating means 26; skimmer carriage drive (motor) means 62; scraper blade drive motor 90; and motorized fan 110.

The fluid layer sensors 138 and 140 can be calibrated to detect various layers of liquid located with in the separating chamber SC including a somewhat clear water layer substantially free of grease, fat, oil and/or solids; a layer of oil; a layer of scum; and a layer of air. Fluid Components Incorporated of San Marcos, Calif., produces sensor Model No. 12-64 designed specifically to sense water, oil, and/or air by sensing different heat transfer rates through the medium in which the sensor is immersed. This sensor can be calibrated to detect the above-identified layers in a precise manner, for example, by using a sample of water having preselected components (e.g., grease, fat and/or oil) to calibrate a point at which the sensor generates a signal for somewhat clear water for use as the water layer sensors.

SYSTEM FOR TREATING WASTE WATER

The apparatus of the present invention described above cooperates with many typical components of a waste water treatment facility including a primary basin or settling pond 146, aerobic and/or anaerobic digester 148; press 36; and/or centrifuge 38 as shown in FIG. 6.

The system of the present invention incorporates the apparatus of the present invention along with a combination of additional features including a gas storage tank 150 connected by gas pipeline 152 to burners 104, a conveyor 86 for feeding waste mass WM from press 36 and/or centrifuge 38 into the drying chamber DC; a dumpster 154 positioned beneath the drying chamber DC for receiving dried waste mass; and a compressor 24 connected by pipeline 32 to air inlets 23 for pumping air into the separating chamber SC. Further, the system includes a number of pumps for providing forced mass transfer through the pipelines connecting various components of the system, such as pumps 162 and 164.

The system can be supplied with additional pumps and remote controlled flow valves, some or all controlled by controller 136 for completely automating the operation of the present system including feedback loops for control/demand operation of the system.

A tank truck 156 is utilized for collecting an aqueous mixture AM containing grease, fat, oil and/or solid components from around the local community. The tank truck 156 is provided with a pump 158 and hose 160 for adding the aqueous mixture AM to the separating chamber SC.

MANUAL OPERATION OF THE PRESENT APPARATUS AND SYSTEM

Treatment of waste water by the present apparatus begins by opening access door 19 and at least partially filling the separating chamber SC with waste water comprising an aqueous mixture AM containing grease, fat, oil and/or solid components. The flow gate 25 is maintained substantially closed during filling to prevent spillage of the aqueous mixture AM into the chute portion CP. Also, scum from the upper portion of primary basin 146 can be pumped through pipeline 166 by pump 162 through inlet conduit 20 into the separating chamber SC for treatment as shown in FIG. 6. Air is then injected through the gas inlets 22 into the separating chamber SC to facilitate the separation of the aqueous mixture AM into a plurality of layers over a period of a few hours up to as long as a couple of days. The aqueous mixture AM will typically separate into a lower layer of pastelike sediment, a somewhat clear water layer positioned over the paste-like sediment layer, an oil layer positioned above the somewhat clear water layer, and a layer of scum positioned above the oil layer. The layer of scum includes grease, fat, oil and/or solid components that have surfaced due to the injection of gas through the aqueous mixture AM during the separation process. Depending upon the composition of the aqueous mixture AM, the oil layer or scum layer may be lacking.

An operator views the aqueous mixture AM located within the separating chamber SC by looking through viewing ports 21 provided in the side wall 13 of the separating chamber SC to determine the extent of separation on layers. When the operator has decided that the layers have separated to a desired extent, he opens the first flow valve 40 that allows the somewhat clear water substantially free of grease, fat and/or solid components to enter the holding chamber HC. The somewhat clear aqueous water that enters the holding chamber HC then exits out through drain 44.

Anytime throughout the operation of the present apparatus, the flow valve 42 can be opened to remove paste-like sediment that has collected at the bottom of the separating chamber SC to be transported to another location in the waste water treatment facility as described below.

After a layer of scum and/or a layer of oil forms above the layer of somewhat clear water within the separating chamber SC, the operator lowers the flow gate 25 by operating the drive means or motor 26. As the top edge of the flow gate 25 is lowered below the top surface of the layer of scum and/or layer of oil, that particular layer or portion of a layer begins to flow over the top of the flow gate into the chute portion CP. Depending on the composition of the waste water comprising the aqueous mixture AM containing grease, fat, oil and/or solid components that has been added to the separating chamber, operation of the skimmer may or may not be necessitated. However, the skimmer 48 is typically utilized to facilitate the quick removal of the layer of scum and/or layer of oil into the chute portion CP. Operation of the skimmer begins by lowering the continuous sheet of material 126 by actuating motor 120 until a desired height skimmer blade 50 is defined by the continuous sheet of material 126. The operator can lower the skimmer blade 50 in increments so as to skim off portions of the layer of scum and/or layer of oil or the lower edge of the skimmer blade can be lowered to a position just above the somewhat clear layer of water for skimming the entire layer(s) of scum and/or layer of oil in a single skimming cycle.

As the layer of scum and/or layer of oil enters into the chute portion CP, the scum and/or layer of oil flow down inclined surface 64 until it reaches and collects at the outlet door 66. As the scum and/or oil flow against the outlet door 66, the weight of the scum and/or oil will force the outlet door 66 open so that it enters into the drying chamber DC. The spray head 68 is operated during movement of scum and/or oil through the chute portion CP to facilitate flowing of the scum and/or oil along the inclined surface 64. Also, the spray head 68, which generally sprays water maintains the chute portion CP in a clean operational condition.

The scum and/or oil entering the drying chamber DC flows into a space located between lower end wall 72 and the first adjacent vertical slat 88 on the left of the drying chamber DC. As this space fills up, the scum and/or oil overflows into the next space located between a pair of adjacent vertical slats 88. The scum and/or oil continues to fill each successive space until the entire bottom wall 82 is covered with scum and/or oil. Thus, slats 88 act as individual flow gates with the top edge of each successive vertical slat being positioned somewhat lower than the preceding one due to the inclined nature of the bottom wall 82 to ensure that the scum and/or oil reaches the right side of the drying chamber DC as shown in FIG. 1. If the vertical slats 88 were not provided extending from the bottom wall 82, the scum and/or oil would flow and build up on the right hand side of the drying chamber DC which would be undesirable due to the lesser surface contact of the scum and/or oil with the circulating air within the drying chamber DC and the lesser surface contact with the bottom wall 82 for heat transfer purposes to cause evaporation. If the bottom wall 82 was oriented substantially horizontally, the scum and/or oil would tend to collect at the left hand side of the drying chamber DC due to somewhat dried scum and/or oil building up on the left hand side of the drying chamber and impeding the flow to the right hand side of the drying chamber DC along the bottom wall 82.

Sludge from the bottom of the primary basin that has been treated for water removal, typically by processing the sludge through a digester followed by treatment with a press or centrifuge, is converted into waste mass that is then conveyed by means of conveyor 86 to inlet port 84 of the drying unit 4. The pair of access doors 85 are formed opened due to the weight of the waste mass WM that has been conveyed into the inlet port 84. The access doors 85 are biased closed after the waste mass WM has passed into the drying chamber DC to prevent the escape of waste fumes.

The burners 104 positioned underneath the bottom wall 82 of the drying chamber DC are operated to provide heat to the scum, oil and/or waste mass located within the drying chamber DC. The burners 104 burn waste methane gas produced at other locations of the waste water treatment facility. As the scum, oil and/or waste mass is heated due to the burners 104 providing heat energy that is conducted across the bottom wall 82 and along the vertical slats 88 contacting with the scum, oil and/or waste mass, water is evaporated into the air being circulated through the drying chamber DC by motorized fan 110.

The moisture laden air within the drying chamber DC is forcibly circulated by motorized fan 110 into the condensing coil 106 of the cooling tower CT. Within the cooling coil 106, moisture condenses and flows to the lowest point in each turn of the condensing coil 106 where it then enters the main drain conduit 114. From the main drain conduit 114, the water then flows downwardly through the trap 116 out to a drain. The drain transports the water to another location of tee water treatment facility for further treatment. Somewhat dried air exits the cooling tower CT from lower end 118 of the condensing coil 106 back into the drying chamber DC where it is circulated to pick up moisture.

After a quantity of scum, oil and/or waste mass has been substantially dried at the bottom of the drying chamber DC, the hinged outlet door 102 is lowered and drive means 90 is operated for driving the scraper blade 92 across the bottom wall 82 for dumping the dried material from the drying unit 4 into the dumpster 154.

AUTOMATIC OPERATION OF THE PRESENT APPARATUS AND SYSTEM

There are many advantages to having the apparatus and system made as fully automatic as possible such as the elimination of an operator and the continuous operation of the apparatus and system for immediately processing waste water collected from the local community as it is delivered to the present apparatus and for processing scum from primary basins as it is produced. Further, the vertically movable skimmer blade 50 allows the addition of waste water to the separating chamber SC without waiting for the waste water already contained in the separating chamber SC to be fully separated before refilling. Sensor 140 located behind the baffle plate 46 is placed slightly above the level of entry of water into the first outlet 28. This sensor 140 operates the flow valve 40 to remove somewhat clear water relatively free of grease, fat and/or oil that exists above the level of the first outlet 28 from the separating chamber SC. When sensor 140 detects the presence of air as the somewhat clear water layer is lowered by draining, sensor 140 will signal controller 136 to close shut the flow valve 40 automatically.

Fluid layer sensors 138 are positioned at predetermined intervals along the vertical direction within the separating chamber SC. For example, a spacing of every six inches would be appropriate in most circumstances. These layer sensors 138 are calibrated to sense a layer of oil and/or a layer of scum in addition to sensing a layer of somewhat clear water. Layer sensors 138 control the operation of motor 120 for varying the height of the skimmer blade 50 or more precisely the bottom edge of the continuous sheet of material 126 within the separating chamber SC. After the addition of waste water or scum into the separating chamber SC, layer sensors 138 provide signals to controller 136. Controller 136 operates remote controlled motor 120 and places the bottom edge of the continuous sheet of material 126 approximately six inches below the upper surface of the aqueous mixture AM contained in the separating chamber SC.

Also, controller 136 activates motor 26 to lower flow gate 25, allowing grease, oil, scum to flow or to be pushed into chute portion CP. The distance the flow gate 25 is lowered, is a function of the density of the separated grease, oil and scum that has been detected by sensors 138 The deeper the layer of separated grease, oil and scum, the lower the flow gate is positioned due to detection by sensors 138. When layer sensors 138 detect a full increment of scum, and/or oil between a pair of adjacent sensors 138, the controller 136 operates the skimmer carriage drive motor 62 to begin a skimming cycle. During the skimmer cycle, the carriage 52 carrying skimmer blade 50 traverses along guide rails 132 in the rightward direction towards the flow gate 25 until it engages with the travel limit switch 142 on the right. The travel limit switch 142 provides a signal to controller 136 for reversing the direction of motor 62. Motor 62 driven in the reverse direction returns the carriage 52 carrying skimmer plate 50 back to its starting position on the left hand side of FIG. 1. If layer sensors 138 then detect another full increment of scum and/or oil, another skimming cycle is repeated and this continues until all scum and/or oil is removed from above the somewhat clear layer of water. Another full increment of scum and/or oil may form with time due to further separation, automatically signalling controller 136 to begin another skimming operation.

If additional waste water is added to the separating chamber SC, the layer sensors 138 provide signals indicating the new level of waste water within the separating chamber SC to controller 136. Controller 136 then automatically positions the bottom edge of the skimmer blade 50 one increment below the surface of the newly added waste water. When sensors 138 detect the presence of a full increment of scum and/or oil, controller 136 begins operation of a skimmer cycle. Thus, scum and/or oil is continuously removed as it is formed above the layer of somewhat clear water.

After scum, oil and/or waste mass has been transferred to the drying chamber DC, humidity sensor 144 detects the rise of humidity above a preset limit and signals controller 136 Controller 136 operates motorized fan 110 for circulating air through the drying chamber DC into the condensing unit 6. When the humidity within the drying chamber falls below a preset limit, after a heating cycle due to most of the water being removed from the contents of the drying chamber, controller 136 operates drive means 90 to scrape and remove the dried contents from drying chamber DC out through outlet door 102 into dumpster 154.

The heating of drying chamber DC can be continuous due to the continuous formation of waste methane gas at the waste water treatment facility or can be intermittent by controller 136 turning burners 104 on and off with appropriate control devices. Gas storage tank 150 can be utilized to store waste methane gas generated by the waste water treatment facility as it is formed. Supply of methane gas from gas storage tank 150 can be controlled by controller 136 operating a valve (not shown) located in gas pipeline 152 on a demand basis allowing intermittent heating of the drying chamber DC.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An apparatus for treating waste water including oil and grease, comprising:
    a separating tank defining a separating chamber for receiving a quantity of waste water; and
    a flow gate positioned at a side of said separating chamber, said flow gate being movably disposed so that it can be lowered for separating a floating component of the waste water from the remaining water relatively free of the floating component by removal of the floating component from said separating chamber,
    and a drying means forming a drying chamber operatively connected to said separating chamber.

2. An apparatus according to claim 1, including a first actuating means for moving said flow gate.

3. An apparatus according to claim 1, including means for injecting gas into the waste water contained within said separating chamber to facilitate flotation of the floating component.

4. An apparatus according to claim 1, including a chute provided between said separating chamber and said drying chamber, said chute being provided with a movable door for opening and closing a passageway through said chute.

5. An apparatus according to claim 4, wherein said chute is provided with a fluid spraying means for facilitating the movement of the floating component from said separating chamber into said drying chamber.

6. An apparatus according to claim 1, wherein said drying chamber is provided with a movable scraper and an outlet door for removing the floating component after being dried from said drying chamber out through said outlet door.

7. An apparatus according to claim 1, including a condensing unit operatively connected with said drying chamber for removing moisture from said drying chamber.

8. An apparatus according to claim 7, wherein said condensing unit includes a cooling tower having a condensing coil operatively connected with said drying chamber.

9. An apparatus according to claim 1, including a skimmer for skimming at least a portion of the floating component towards said flow gate to facilitate spillage and removal from said separating chamber.

10. An apparatus according to claim 9, wherein said skimmer is movably mounted within said separating chamber so as to be movable back and forth within said chamber in a direction towards and away from said flow gate.

11. An apparatus according to claim 10, wherein said skimmer comprises a carriage- movably disposed along guides positioned within said separating chamber and a skimmer blade, said skimmer blade being mounted on said carriage so as to be traversible back and forth within said separating chamber in a direction towards and away from said flow gate.

12. An apparatus according to claim 10, including a second actuating means for driving said skimmer back and forth.

13. An apparatus according to claim 9, wherein said skimmer is adjustable in height within said chamber.

14. An apparatus according to claim 12, wherein said skimmer is movably mounted within said chamber so as to be movable back and forth within said chamber in a direction towards and away from said flow gate.

15. An apparatus according to claim 14, wherein said skimmer is defined by a sheet of material having a substantially horizontally disposed edge movably disposed upwardly and downwardly, said skimmer being provided with guide means for guiding the path of movement of said sheet of material.

16. An apparatus according to claim 14, including a third actuating means for raising and lowering said skimmer within said chamber.

17. An apparatus according to claim 16, including a second sensing means for detecting the floating component, and for providing a signal for controlling said second actuating means and said third actuating means.

18. An apparatus according to claim 17, wherein said second sensing means comprises a plurality of spaced apart sensors oriented substantially in the vertical direction within said separating chamber.

19. An apparatus according to claim 16, wherein said skimmer is defined by a sheet of material having a substantially horizontally disposed edge movably disposed upwardly and downwardly, said skimmer being provided with guide means for guiding the path of movement of said sheet of material.

20. An apparatus according to claim 19, wherein said third actuating means includes a motor drive shaft, said sheet of material being wound on and connected to said shaft, said shaft being supported on a movable carriage disposed within said separating chamber.

21. An apparatus according to claim 20, wherein said sheet of material is defined by a plurality of hinged strips of metal.

22. An apparatus according to claim 1, including first drain means for selectively draining an amount of water relatively free of the floating component from a lower portion of said separating chamber.

23. An apparatus according to claim 22, wherein said first drain means includes a first conduit having a first flow valve.

24. An apparatus according to claim 23, including second drain means for selectively draining an amount of sediment which has settled to the bottom of the said separating chamber from the waste water contained within said separating chamber.

25. An apparatus according to claim 24, Wherein said second drain means includes a second conduit having a second controlled flow valve.

26. An apparatus according to claim 23, including a first sensing means for detecting water relatively free of the floating component, and for providing a signal for controlling said first flow valve, said first sensing means being positioned above an inlet into said first conduit within said separating chamber.

27. An apparatus according to claim 26, including a second sensing means for detecting the floating component, and for providing a signal for controlling a second actuating means and said third actuating means.

28. An apparatus according to claim 27, including a control means for controlling a first actuating means for moving said flow gate, as well as said second and third actuating means.

29. An apparatus according to claim 28, wherein said control means automatically actuates said second actuating means to lower said skimmer in predetermined sized increments after each skimming cycle.

30. An apparatus according to claim 28, wherein said control means actuates said third actuating means to automatically position the height of said skimmer within said separating chamber and actuates said second actuating means to begin a skimming cycle upon said second sensing means sensing floating component.

31. An apparatus according to claim 30, wherein said second sensing means signals said control means to automatically actuate said third actuating means for repositioning the height of said additional waste water into said separating chamber.

32. A system for treating waste water and sludge, comprising:
a separating tank defining a separating chamber for receiving a quantity of waste water,
a flow gate positioned at a wall of said separating chamber, said flow gate being movably disposed so that it can be lowered for separating a floating component of the waste water from water relatively free of the floating component by removal of the floating component from said separating chamber,
a drying unit operatively connected to said separating chamber with said flow gate disposed therebetween, said drying unit including a heating unit; and
a condensing unit operatively connected to said drying unit for removing humidity from drying unit.

33. A system according to claim 32, including a skimmer for skimming at least a portion of the floating component towards said flow gate to facilitate spillage and removal from said separating chamber.

34. A system according to claim 32, including means for injecting gas into the waste water contained within said separating chamber to facilitate flotation of the floating component.

35. A system according to claim 32, including means for adding scum from a settling pond into said separating chamber.

36. A system according to claim 32, including a tank truck for collecting waste water and then adding the waste water to said separating chamber.

37. A system according to claim 32, including a gas storage tank and supply means for storing gas generated by a waste water treatment facility and for fueling said heating unit.

38. A system according to claim 32, including means for removing water from sludge producing a waste mass, and conveying means for conveying the waste mass to said drying chamber.

39. A system according to claim 32, including a dump means for receiving dried waste mass and/or dried floating component from said drying unit.

40. An apparatus for treating waste water including oil and grease, comprising:
a separating tank defining a separating chamber for receiving a quantity of waste water;
a flow gate positioned at a side of said separating chamber, said flow gate being planar and vertically movable so that it can be lowered for separating a floating component of the waste water from the remaining water relatively free of the floating component by removal of the floating component from said separating chamber and a drying means forming a drying chamber operatively connected to said separating chamber; and
including a skimmer for skimming at least a portion of the floating component towards said flow gate to facilitate spillage and removal from said separating chamber.

41. An apparatus according to claim 40, including means for injecting gas into the waste water contained within said separating chamber to facilitate flotation of the floating component.

42. An apparatus according to claim 40, including first drain means for selectively draining an amount of water relatively free of the floating component from a lower portion of said separating chamber.

43. An apparatus according to claim 40, including a chute provided between said separating chamber and said drying chamber, said chute being provided with a movable door for opening and closing a passageway through said chute.

44. An apparatus according to claim 43, wherein said chute is provided with a fluid spraying means for facilitating the movement of the floating component from said separating chamber into said drying chamber.

* * * * *